US008041148B2

(12) United States Patent  
Sugihara

(10) Patent No.: US 8,041,148 B2
(45) Date of Patent: Oct. 18, 2011

(54) RECORDING MEDIUM STORING IMAGE PROCESSING PROGRAM AND IMAGE PROCESSING METHOD

(75) Inventor: Mari Sugihara, Tokyo (JP)

(73) Assignee: Nikon Corporation, Tokyo (JP)

( * ) Notice: Subject to any disclaimer, the term of this patent is extended or adjusted under 35 U.S.C. 154(b) by 916 days.

(21) Appl. No.: 12/068,433

(22) Filed: Feb. 6, 2008

(65) Prior Publication Data

US 2008/0219591 A1 Sep. 11, 2008

(30) Foreign Application Priority Data

Mar. 9, 2007 (JP) ................................ 2007-059960

(51) Int. Cl.
 *G06K 9/36* (2006.01)
 *G06K 7/00* (2006.01)
 *G06T 15/50* (2011.01)
 *G01B 9/00* (2006.01)
(52) U.S. Cl. ......... 382/284; 382/312; 345/426; 356/124
(58) Field of Classification Search .................. 382/108, 382/165, 284, 300, 305, 307, 312; 356/124, 356/364, 487, 491; 345/426, 582, 589, 606
 See application file for complete search history.

(56) References Cited

U.S. PATENT DOCUMENTS

| 4,931,657 | A * | 6/1990 | Houston et al. .......... 250/559.08 |
| 7,215,897 | B2 * | 5/2007 | Yamamoto et al. ............. 399/49 |
| 7,356,229 | B2 * | 4/2008 | Ouderkirk et al. ............ 385/115 |
| 7,522,762 | B2 * | 4/2009 | Rea et al. ....................... 382/141 |
| 7,689,035 | B2 * | 3/2010 | Mallick et al. ................ 382/163 |
| 7,830,522 | B2 * | 11/2010 | Han et al. ....................... 356/446 |
| 2002/0172432 | A1 | 11/2002 | Pilu et al. |
| 2006/0008171 | A1 | 1/2006 | Petschnigg et al. |

FOREIGN PATENT DOCUMENTS

| JP | A-2000-090233 | 3/2000 |
| JP | A-2003-256812 | 9/2003 |
| JP | A-2005-004468 | 1/2005 |

OTHER PUBLICATIONS

Godin G., et al., "Separation of diffuse and specular components of surface reflection by use of polarization and statistical analysis of images", IEEE Transactions on Pattern Analysis and Machineintelligence, pp. 639-647, vol. 26, No. 5, May 1, 2004.
Farid H. et al., "Separating reflections and lighting using independent components analysis", Software Maintenance, 1998, Proceedings, International Conference on Bethesda, MD, USA Nov. 16-20, 1998, pp. 262-267, Jun. 23, 1999.
Jul. 26, 2011 Office Action issued in Japanese Patent Application No. 2007-059960 (with translation).

* cited by examiner

*Primary Examiner* — Kanjibhai Patel
(74) *Attorney, Agent, or Firm* — Oliff & Berridge, PLC

(57) ABSTRACT

An image processing program causes a computer to execute the following steps. A first step reads data of a first image and data of a second image which are generated by imaging a common object under natural light and have different contents of specular reflection components. A second step generates an output image which gives a different visual impression of the object than the first image and the second image, based on difference data of the specular reflection components extracted from the first image and the second image.

9 Claims, 5 Drawing Sheets

COEFFICIENT TABLE

|  |  | GLOSS ENHANCEMENT AMOUNT | | | |
| --- | --- | --- | --- | --- | --- |
|  |  | ZERO | WEAK | STANDARD | STRONG |
| TEXTURE ENHANCEMENT AMOUNT | ZERO | Whl= 0.0<br>Wsr= 0.0<br>Wp = 1.0 | Whl= 0.3<br>Wsr= 0.0<br>Wp = 0.7 | Whl= 0.5<br>Wsr= 0.0<br>Wp = 0.5 | Whl= 0.7<br>Wsr= 0.0<br>Wp = 0.3 |
|  | WEAK | Whl= 0.0<br>Wsr= 0.3<br>Wp = 0.7 | Whl= 0.25<br>Wsr= 0.25<br>Wp = 0.5 | Whl= 0.4<br>Wsr= 0.2<br>Wp = 0.4 | Whl= 0.6<br>Wsr= 0.1<br>Wp = 0.3 |
|  | STANDARD | Whl= 0.0<br>Wsr= 0.5<br>Wp = 0.5 | Whl= 0.2<br>Wsr= 0.4<br>Wp = 0.4 | Whl= 0.33<br>Wsr= 0.33<br>Wp = 0.34 | Whl= 0.5<br>Wsr= 0.25<br>Wp = 0.25 |
|  | STRONG | Whl= 0.0<br>Wsr= 0.7<br>Wp = 0.3 | Whl= 0.1<br>Wsr= 0.6<br>Wp = 0.3 | Whl= 0.25<br>Wsr= 0.5<br>Wp = 0.25 | Whl= 0.4<br>Wsr= 0.4<br>Wp = 0.2 |

FIG.5

RECORDING MEDIUM STORING IMAGE PROCESSING PROGRAM AND IMAGE PROCESSING METHOD

CROSS-REFERENCE TO RELATED APPLICATION

This application is based upon and claims the benefit of priority from Japanese Patent Application No. 2007-059960, filed on Mar. 9, 2007, the entire contents of which are incorporated herein by reference.

BACKGROUND

1. Field

The present invention relates to an image processing program and an image processing method for performing image processing using plural images having different specular reflection components.

2. Description of the Related Art

It is a conventional procedure to form an image intended by a user by performing image processing on a captured image on a computer. In particular, in recent years, users' demand that the glossiness, texture, etc. of an image be adjusted easily by image processing has been increasing. Japanese Unexamined Patent Application Publication No. 2005-4468 discloses a method for generating a simulation image in which the texture of a subject is changed.

However, in general, to adjust the glossiness or texture of an image by a conventional technique, a special imaging apparatus, special illumination, and the like are necessary at the time of shooting. For example, in the case of the above-mentioned Japanese Unexamined Patent Application Publication No. 2005-4468, an image taken through a polarizing filter under polarized illumination and an image taken under polarized illumination without a polarizing filter are necessary. Therefore, the above method is not applicable to, for example, a scene in which polarized illumination cannot be prepared.

SUMMARY

The present invention has been made to solve the above problems, and an object of the invention is therefore to provide means capable of adjusting visual impressions of an object as typified by glossiness and texture relatively easily by image processing.

An image processing program according to a first aspect of the invention causes a computer to execute the following steps. A first step reads data of a first image and data of a second image each of which are generated by imaging a common object under natural light and have different contents of specular reflection components. A second step generates an output image which gives a different visual impression of the object than the first image and the second image, based on difference data of the specular reflection components extracted from the first image and the second image.

A second aspect of the invention is such that, in the first aspect of the invention, the second step generates an output image by multiplying the difference data by at least one of a first coefficient for adjustment of a texture component of an image and a second coefficient for adjustment of a gloss component of an image.

A third aspect of the invention is such that, in the second aspect of the invention, the second step multiplies the whole of the difference data by the first coefficient.

A fourth aspect of the invention is such that, in the second or third aspect of the invention, the second step extracts part of the difference data whose luminance values are greater than or equal to a threshold value and multiplies the extracted part by the second coefficient.

A fifth aspect of the invention is such that, in any of the second to fourth aspects of the invention, the second step generates an output image by combining the difference data multiplied by at least one of the first coefficient and the second coefficient with data of an internal reflection component which is based on at least one of the first image and the second image.

In addition, an image processing method, an image processing apparatus which executes the above image processing program, and other things that are expressed by converting the above constitution of the invention are effective as specific forms of the invention.

BRIEF DESCRIPTION OF THE DRAWINGS

FIG. 5 is a schematic diagram showing an exemplary coefficient table.

DETAILED DESCRIPTION OF THE EMBODIMENTS

Figure 1:
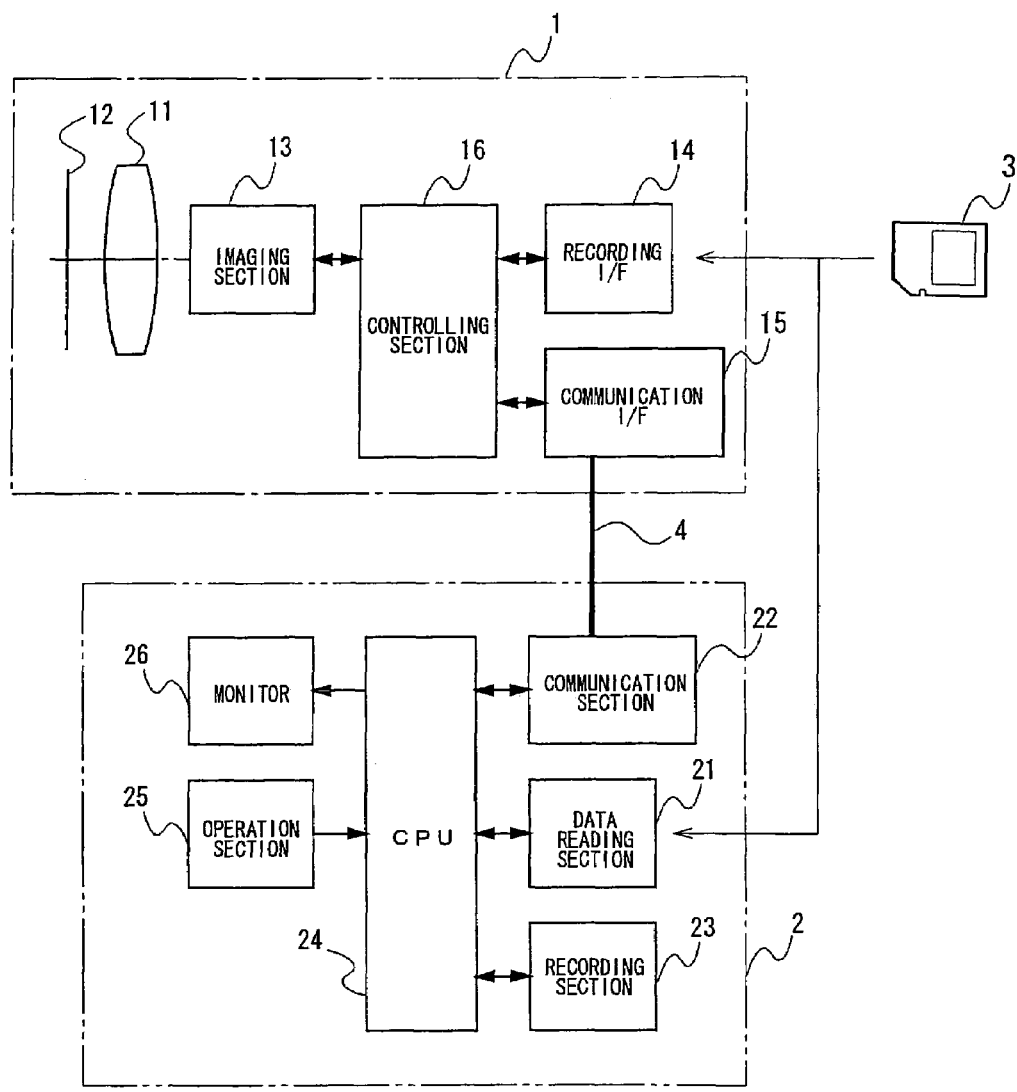
FIG. 1 is a block diagram outlining an image processing system according to an embodiment.

FIG. 1 is a block diagram outlining an image processing system according to an embodiment. The image processing system is composed of an electronic camera 1 and an image processing apparatus 2.

The electronic camera 1 takes images to become subjects of image processing. The electronic camera 1 is equipped with an imaging lens 11, a polarizing filter 12, an imaging section 13, a recording I/F 14, a communication I/F 15, and a controlling section 16. The imaging section 13, the recording I/F 14, and the communication I/F 15 are connected to the controlling section 16, respectively.

The imaging lens 11 forms an object image on an imaging device (not shown) of the imaging section 13. In front of the imaging lens 11, the polarizing filter 12 is attached detachably. A user can adjust the polarization component of a light flux passing through the polarizing filter 12 by rotating the polarizing filter 12 which is attached to the imaging lens 11.

The imaging section 13 images an object based on a light flux that has passed through the imaging lens 11 and the polarizing filter 12, and generates image data. The imaging section 13 has the imaging device for performing photoelectric conversion on the object image, an A/D conversion section for A/D-converting the output of the imaging device, and an image processing section for performing predetermined image processing on data of the captured image. The individual components of the imaging section 13 are omitted and not shown in FIG. 1.

The recording I/F 14 writes image data to a recording medium 3 (e.g., memory card) which is connected to a connector. The communication I/F 15 controls data transmission/reception to/from the image processing apparatus 2 which is connected via a known communication line 4 according to a predetermined communication standard.

The controlling section 16 is a processor that controls the electronic camera 1 as a whole. The controlling section 16 controls operation of each section of the electronic camera 1 according to a sequence program and performs various computations (e.g., AF computation and AE computation) that are necessary at the time of shooting.

The image processing section 2 performs image processing on image data acquired from the electronic camera 1. The image processing section 2 has a data reading section 21, a communication section 22, a recording section 23, a CPU 24, an operation section 25, and a monitor 26. The data reading section 21, the communication section 22, the recording section 23, the operation section 25, and the monitor 26 are connected to the CPU 24, respectively. The image processing apparatus 2 according to the embodiment may be, for example, a personal computer.

The data reading section 21 has a connector to which the recording medium 3 is to be connected. The data reading section 21 reads image data from the recording medium 3 that is connected to the connector. The communication section 22 controls, according to a predetermined communication standard, data transmission/reception to/from the electronic camera 1 which is connected via the communication line 4.

An image processing program and data groups (e.g., a coefficient table shown in FIG. 5) which are necessary during execution of the program are recorded in the recording section 23. Also, image data that has been subjected to image processing can be recorded in the recording section 23. The CPU 24 executes the image processing program and thereby performs various computations relating to image processing on image data. The operation section 25 receives, from a user, various manipulation inputs relating to the image processing program. A manipulation screen of the image processing program, a display screen for display of an image that has or has not been subjected to image processing, and other screens are displayed on the monitor 26.

Figure 2:
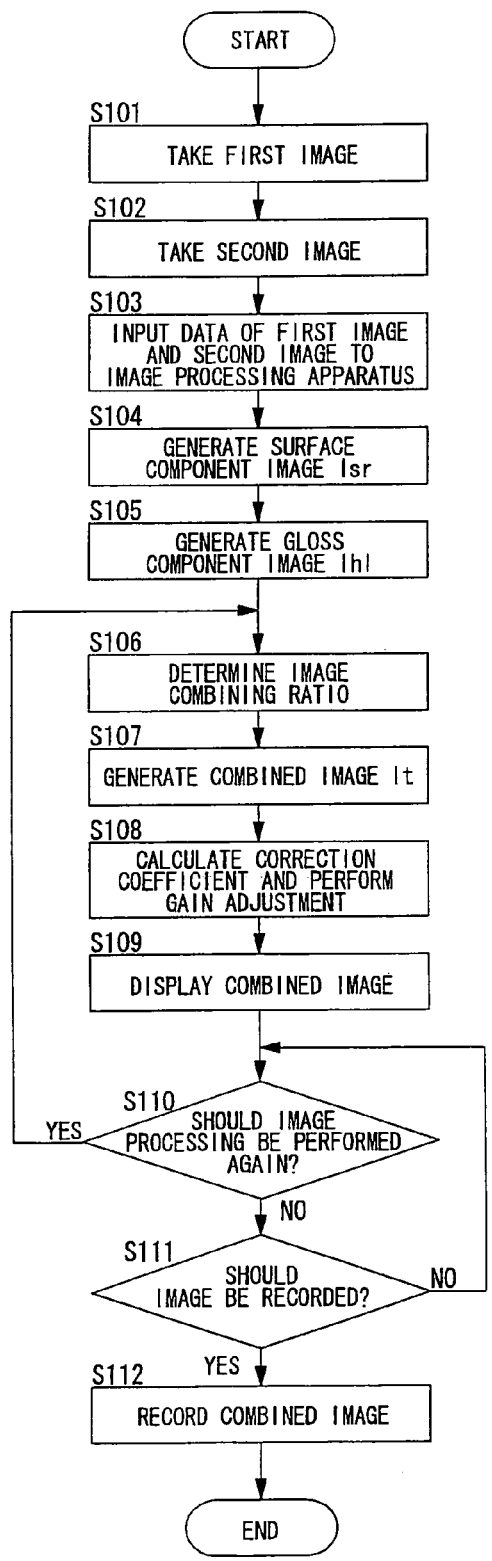
FIG. 2 is a flowchart of image processing according to the embodiment.

Next, a series of steps of image processing according to the embodiment will be described with reference to a flowchart of FIG. 2.

Step S101: A user takes a first image with the electronic camera 1. More specifically, the first image is taken in the following manner.

First, the user fixes the positions of an object and the electronic camera 1 under natural light (i.e., light from which no polarization features are detected).

Figure 3:
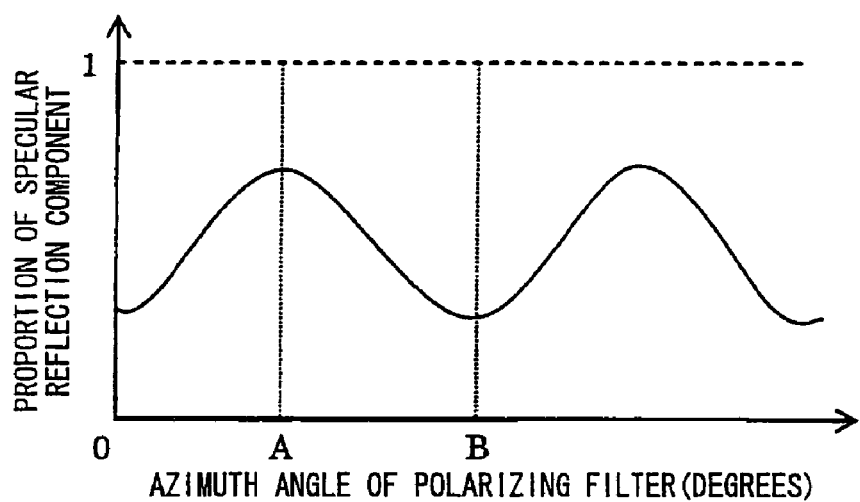
FIG. 3 shows how the proportion of a specular reflection component varies with the azimuth angle of a polarizing filter.

Second, the user adjusts the orientation of the polarizing filter 12 which is attached to the electronic camera 1 to a predetermined azimuth angle. FIG. 3 shows how the proportion of a specular reflection component varies with the azimuth angle of the polarizing filter 12. In particular, at step S101 of this embodiment, the user rotates the polarizing filter 12 so that the image becomes brightest and thereby establishes a state that the p-polarized component is blocked most whereas the s-polarized component passes through the polarizing filter 12 most (position A in FIG. 3).

Here, the s-polarized light refers to light whose polarization direction of the incoming light polarizes parallel to the reflection surface and perpendicular to the incidence plane (i.e., the plane formed by incident light and reflection light). The p-polarized light refers to light whose polarization direction of the incoming light is included in the above-mentioned incidence plane and polarizes perpendicular to the s-polarized light. According to the dichromatic reflection model, light reflected from the surface of a substance is the sum of two components, that is, an internal reflection component and a specular reflection component. When natural light is incident on a substance from the air, s-polarized light is enhanced in the reflection light. That is, an s-polarized component is dominant in a specular reflection component produced by a substance. On the other hand, a p-polarized component is dominant in an internal reflection component produced by a substance.

Third, the user shoots the object with the electronic camera 1. As a result, the electronic camera 1 generates data of a first image (s-polarized component image Is) which contains a more specular reflection component.

Step S102: The user takes a second image with the electronic camera 1. At step S102, the user shoots, under natural light, the same object as was shot to take the first image while changing only the orientation of the polarizing filter 12. Naturally, the resolution (image size) of the second image is set the same as that of the first image which was taken at step S101.

At step S102, the orientation of the polarizing filter 12 is set so that at least the s-polarized component is different in magnitude than in step S101. In particular, at step S102 of the embodiment, the user rotates the polarizing filter 12 by 90° from the state of step S101 so that the p-polarized component passes through the polarizing filter 12 most whereas the s-polarized component is blocked most (position B in FIG. 3).

As a result, the electronic camera 1 can generate data of the second image (p-polarized component image Ip) in which the composition is the same as in the first image and the specular reflection component is blocked.

Figure 4:
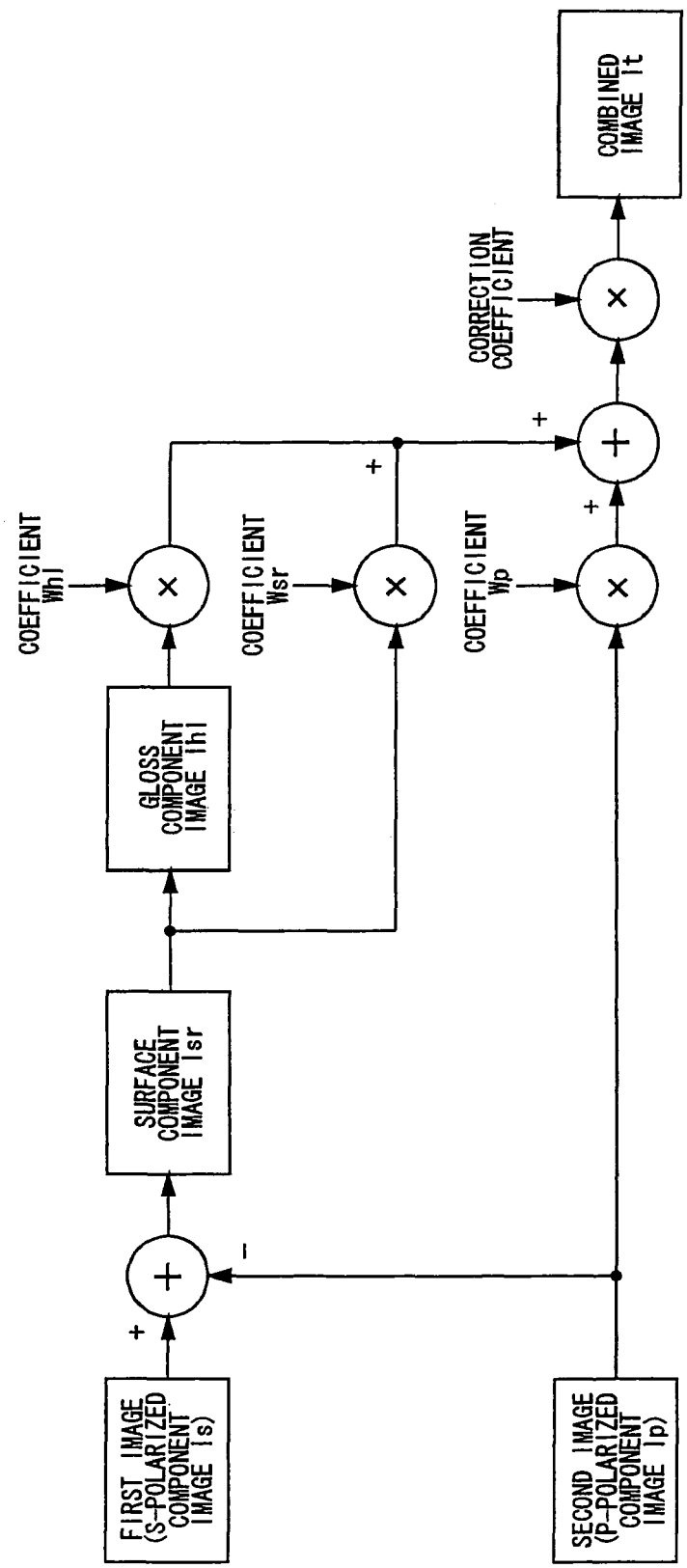
FIG. 4 is a schematic diagram outlining image processing which is performed according to an image processing program.

Step S103: The user inputs the data of the first image (generated at step S101) and the data of the second image (generated at step S102) to the image processing apparatus 2. At step S103, the transfer of the image data from the electronic camera 1 to the image processing apparatus 2 is realized via the recording medium 3 or by a data communication over the communication line 4. As a result, the CPU 24 causes the data of the first image and the data of the second image to be read into the image processing apparatus 2. FIG. 4 outlines image processing (the following steps S104-S108) which is performed according to the image processing program.

Step S104: The CPU 24 of the image processing apparatus 2 generates a surface component image (Isr) which is a difference image of the first image and the second image. More specifically, the CPU 24 subtracts the signal level of pixel of the second image from that of the corresponding pixel of the first image, respectively. The CPU 24 thus generates data of a surface component image (Isr=Is−Ip). Therefore, the surface component image (Isr) is an image obtained by extracting the specular reflection component from the first image.

Step S105: The CPU 24 generates data of a gloss component image (IhI) based on the data of the surface component image (Isr). First, the CPU 24 generates a luminance histogram of the surface component image (Isr). Then, the CPU 24 generates data of a gloss component image (IhI) by extracting a higher component of the luminance histogram of the surface component image (i.e., pixels of the surface component image whose luminance values are greater than or equal to a threshold value).

Step S106: The CPU 24 determines a combining ratio of the gloss component image, the surface component image, and the p-polarized component image according to a coefficient table which is recorded in the recording section 23.

FIG. 5 schematically shows an exemplary coefficient table. The coefficient table records a corresponding relationship between combinations of a gloss enhancement amount and a texture enhancement amount and image combining ratios. Each of the gloss enhancement amount and the texture enhancement amount is selected from four stages, that is, "zero," "weak," "standard," and "strong" (the degree of enhancement increases in this order). Therefore, in this embodiment, the number of combinations of the gloss enhancement amount and the texture enhancement amount is 16 (4 stages×4 stages). If the gloss enhancement amount is set stronger, the gloss component image is assigned a heavier weight, whereby the glossiness of the object is more enhanced by the image processing. If the texture enhancement amount is set stronger, the surface component image is assigned a heavier weight, whereby the texture of the object is more enhanced by the image processing.

On the other hand, the image combining ratio is a ratio among a coefficient value (WhI) for a gloss component image, a coefficient value (Wsr) for a surface component image, and a coefficient value (Wp) for a p-polarized component image.

Specific processing performed at step S106 will be described below. First, the CPU 24 receives, through the operation section 25, the user's inputs which specify a gloss enhancement amount and a texture enhancement amount. The CPU 24 refers to an entry of the coefficient table that corresponds to the combination of the input gloss enhancement amount and texture enhancement amount and acquires a coefficient value (WhI) for a gloss component image, a coefficient value (Wsr) for a surface component image, and a coefficient value (Wp) for a p-polarized component image.

Step S107: The CPU 24 combines the gloss component image, the surface component image, and the p-polarized component image according to the combining ratio which was determined at step S106 and thereby generates data of a combined image.

More specifically, first, the CPU 24 reads the signal levels of pixels at the same position of the three images, that is, the gloss component image, the surface component image, and the p-polarized component image. Then, the CPU 24 calculates the signal level of the combined image It by adding up the signal level of the gloss component image (IhI) multiplied by the coefficient value WhI, the signal level of the surface component image (Isr) multiplied by the coefficient value Wsr, and the signal level of the p-polarized component image (Ip) multiplied by the coefficient value Wp (i.e., combined image It=IhI×WhI+Isr×Wsr+Ip×Wp). The CPU 24 generates data of the combined image by performing the above operation repeatedly on a pixel-by-pixel basis.

Step S108: The CPU 24 calculates a correction coefficient which converts the sum of the coefficient value (Wsr) for a surface component image and the coefficient value (Wp) for a p-polarized component image among the respective coefficient values acquired at step S106 into "1" (i.e., correction coefficient=1/(Wsr+Wp)). For example, where the gloss enhancement amount is "weak" and the texture enhancement amount is "standard" (see FIG. 5), the correction coefficient is calculated as 1/(0.4+0.4)=1.25.

Then, the CPU 24 performs a gain adjustment by multiplying the entire combined image It generated at step S107 by the above correction coefficient. As a result, the glossiness of the combined component image is more enhanced.

Step S109: The CPU 24 displays the combined image on the monitor 26. As a result, the user can judge the quality of the image as well as whether to perform image processing again.

Step S110: The CPU 24 judges whether or not the operation section 25 has received, from the user, an input as an instruction to perform image processing again. If such an input has been received (S110: yes), the CPU 24 returns to step S106 and performs image processing again while altering the gloss enhancement amount and the texture enhancement amount. On the other hand, if no such input has been received (S110: no), the CPU 14 moves to step S111.

Step S111: The CPU 24 judges whether or not the operation section 25 has received, from the user, an input as an instruction to record the image. If such an input has been received (S111: yes), the CPU 24 moves to step S112. On the other hand, if no such input has been received (S111: no), the CPU 14 returns to step S110 to repeat the above operation.

Step S112: The CPU 24 records the data of the combined image in the recording section 23. The description of the flowchart of FIG. 2 ends here.

The operation and effect of the embodiment will be described below. In the embodiment, a surface component of an image and a gloss component of an image are extracted from the difference between a first image and a second image, each with different content ratio of a specular reflection component. A combined image is generated by recombining these components after multiplying them by weighting coefficients. Therefore, in the embodiment, the visual impressions of an object as typified by the glossiness and the texture can be adjusted easily by image processing. Furthermore, in the embodiment, since the first image and the second image can be taken under natural light merely by changing the orientation of the polarizing filter 12, no special illumination, special imaging apparatus, or the like is necessary at the time of shooting.

(Modifications to the Embodiment)

(1) The manner of combining of a first image and a second image in the above embodiment is just an example. For example, in taking each of a first image and a second image in the embodiment, the orientation of the polarizing filter 12 may be set arbitrarily.

It is possible to employ as a first image an image that is taken by removing the polarizing filter 12 and employ as a second image a p-polarized component image that is taken by blocking an s-polarized component with the polarizing filter 12. The same image processing as described in the above embodiment is performed.

(2) Where image data of the above embodiment is in the RGB format, if a combined image is generated by using all of RGB components, the hue difference from an image taken without insertion of the polarizing filter 12 may become so large that a user feels it to be improper. Or the enhancement of texture may cause a hue difference. Such a hue variation can be avoided by converting a first image and a second image into the YCbCr format and performing the image processing of the embodiment only on the luminance component Y. Another option is to convert a first image and a second image into a format corresponding to the L*a*b* color space and perform the image processing of the embodiment only on the lightness component L.

(3) In the above embodiment, the image processing program may be executed on the electronic camera 1.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. A non-transitory computer readable recording medium storing an image processing program which causes a computer to execute:

a first step reading data of a first image and data of a second image each of which are generated by imaging a common object under natural light and have different contents of specular reflection components; and a second step generating an output image which gives a different visual impression of said object than said first image and said second image, based on difference data of said specular reflection components extracted from said first image and said second image, wherein said second step generates said output image by multiplying said difference data by at least one of a first coefficient for adjustment of a texture component of an image and a second coefficient for adjustment of a gloss component of an image.

2. The non-transitory computer readable recording medium storing the image processing program according to claim 1, wherein said second step generates said output image by combining said difference data multiplied by at least one of said first coefficient and said second coefficient with data of an internal reflection component which is based on at least one of said first image and said second image.

3. The non-transitory computer readable recording medium storing the image processing program according to claim 1, wherein said second step extracts part of said difference data whose luminance values are greater than or equal to a threshold value and multiplies said extracted part by said second coefficient.

4. The non-transitory computer readable recording medium storing the image processing program according to claim 3, wherein said second step generates said output image by combining said difference data multiplied by at least one of said first coefficient and said second coefficient with data of an internal reflection component which is based on at least one of said first image and said second image.

5. The non-transitory computer readable recording medium storing the image processing program according to claim 1, wherein said second step multiplies the whole of said difference data by said first coefficient.

6. The non-transitory computer readable recording medium storing the image processing program according to claim 5, wherein said second step generates said output image by combining said difference data multiplied by at least one of said first coefficient and said second coefficient with data of an internal reflection component which is based on at least one of said first image and said second image.

7. The non-transitory computer readable recording medium storing the image processing program according to claim 5, wherein said second step extracts part of said difference data whose luminance values are greater than or equal to a threshold value and multiplies said extracted part by said second coefficient.

8. The non-transitory computer readable recording medium storing the image processing program according to claim 7, wherein said second step generates said output image by combining said difference data multiplied by at least one of said first coefficient and said second coefficient, and data of an internal reflection component which is based on at least one of said first image and said second image.

9. An image processing method comprising:

a first step reading data of a first image and data of a second image each of which are generated by imaging a common object under natural light and have different contents of specular reflection components; and a second step generating an output image which gives a different visual impression of said object than said first image and said second image, based on a difference between said specular reflection components extracted from said data of said first image and said data of said second image, wherein said second step generates said output image by multiplying said difference data by at least one of a first coefficient for adjustment of a texture component of an image and a second coefficient for adjustment of a gloss component of an image.

* * * * *